United States Patent [19]
Pettigrew et al.

[11] Patent Number: 5,117,175
[45] Date of Patent: May 26, 1992

[54] REMOTE BIAS VOLTAGE SETTING LTC CONTROL SYSTEM

[76] Inventors: Robert D. Pettigrew, 12384 Windtree Blvd., Seminole, Fla. 34642; Sanh D. Luong, 2437 Old Coach Trail, Clearwater, Fla. 34625

[21] Appl. No.: 598,218

[22] Filed: Oct. 16, 1990

[51] Int. Cl.⁵ .............................................. G05F 1/14
[52] U.S. Cl. ..................... 323/256; 364/492; 307/31
[58] Field of Search ............... 323/256, 247; 364/492; 307/31

[56] References Cited

U.S. PATENT DOCUMENTS

| | | | |
|---|---|---|---|
| 2,747,157 | 5/1956 | Pinney | 325/256 |
| 3,238,442 | 3/1966 | Holtje | 323/256 |
| 4,323,838 | 4/1982 | Pettigrew | 323/256 |
| 4,384,247 | 5/1983 | Stewart | 323/256 |
| 4,413,189 | 11/1983 | Bottom, Jr. | 323/257 |
| 4,419,619 | 12/1983 | Jindrick et al. | 323/341 |
| 4,540,934 | 9/1985 | Hübel | 323/341 |
| 4,695,737 | 9/1987 | Rabon et al. | 307/31 |

*Primary Examiner*—Steven L. Stephan
*Assistant Examiner*—Ben Davidson
*Attorney, Agent, or Firm*—Leo J. Aubel

[57] ABSTRACT

In a alternating current power distribution system utilizing load tap changing (LTC) transformers having selectively actuable tap selector switches operable in response to an LTC control, system including circuitry for providing remotely adjustable bias voltage for combining with the LTC control voltage to remotely control any change of the center operating level of the band.

4 Claims, 8 Drawing Sheets

REMOTE BIAS VOLTAGE SETTING LTC CONTROL SYSTEM

BACKGROUND OF INVENTION

This invention is generally related to U.S. Pat. No. 3,721,894 entitled Regulator Control issued to Robert W. Beckwith and to U.S. Pat. No. 4,323,838 issued to Robert D. Pettigrew; the disclosure thereof being incorporated herein, by reference.

Load tap changing (LTC) transformers which automatically adjust to maintain a constant voltage are utilized in electrical power transmission systems for monitoring and controlling the voltage output. In such systems, any changes from a predefined voltage bandwidth are monitored and means are provided for changing the tap of the associated power transformers to regulate or bring the voltage within the selected bandwidth.

Tap changing transformer controls commonly provide means to change tap selector switches to contact a point of desired potential. For example, should the voltage in the electrical power transmission system go below a selected potential, provision is made to energize an associated motor to drive tap selector switches to make contact to a point of higher potential. Should the voltage go above the selected potential the motor is energized to drive the tap selector switches to make contact with a point of lower potential.

In recent years, the electric utility industry has become increasingly conscious of the need for reactive power management. Numerous systems and methods for obtaining improved active power monitoring and control have been developed. Various algorithms are known including linear and non linear programming which can optimize voltage control of electrical power systems. Normally the highest priority control objective is to eliminate violations of preset voltage limits, a second objective is to minimize those voltage violations that cannot be eliminated; and a third objective is to minimize the active transmission losses of the system.

Figure 3:
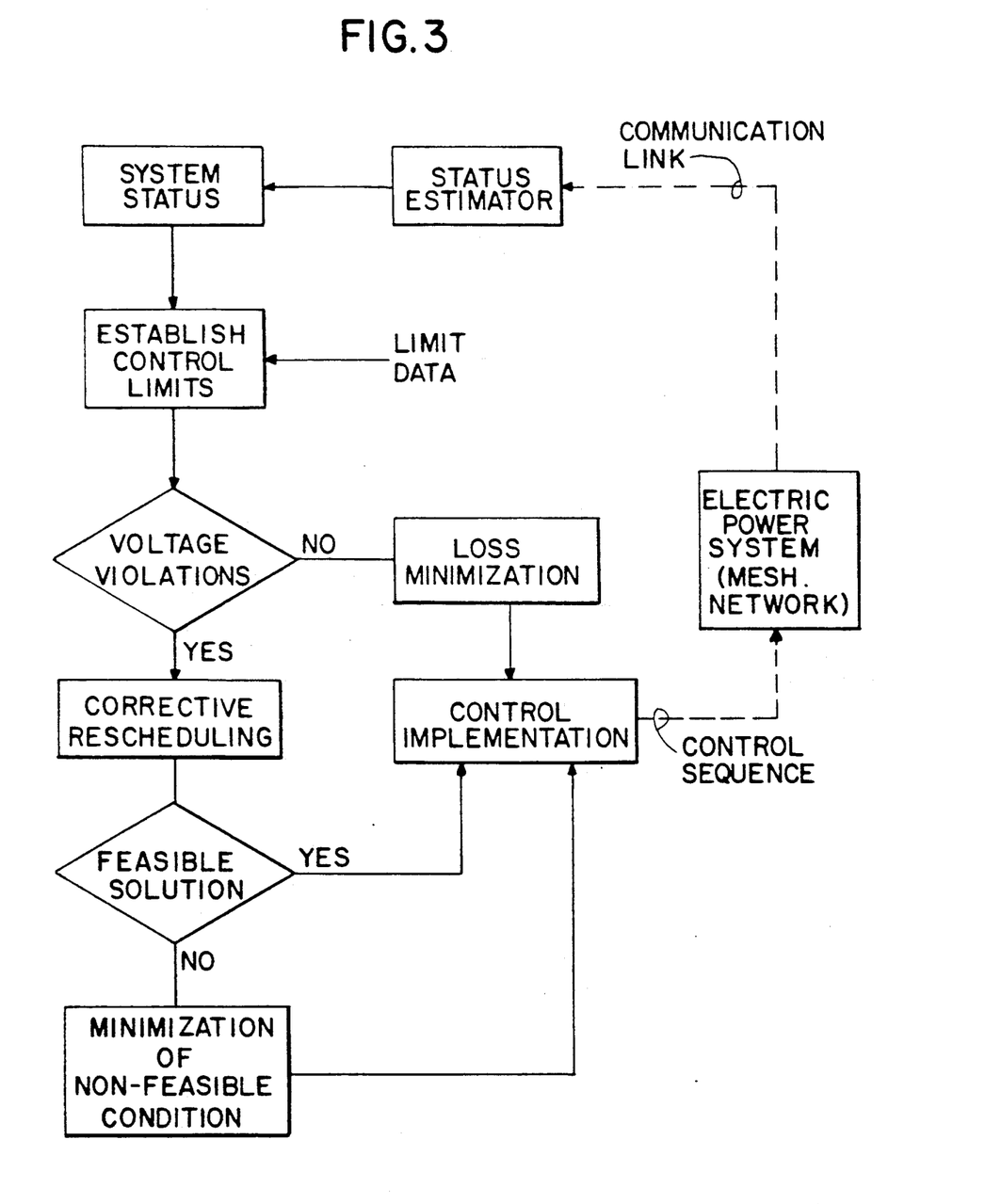
FIG. 3 is a program and flow diagram of control process for a network utilizing the present invention.

In the prior art systems, devices with local intelligence such as load tap changing transformers, and automatic switching capacitors adjust voltages based on values sensed at their specific locations. As transmission systems become more complex and more fully utilized, these localized solutions are often not adequate, since a change at one point on the system can, and does, significantly affect other parts of the system. Accordingly, an integrated, generalized automated process and controls are necessary to continuously maintain the voltage limits required throughout the system. A flow diagram generally outlining the foregoing type of process is depicted in FIG. 3. Referring to FIG. 3 when voltage discrepancies are sensed, corrective activity is initiated. Processing of the algorithms indicates whether a feasible solution is available. If there is a feasible solution this data is coupled as an input to the control implementation device. If there is no feasible solution the data is fed as an input to the control implementation device as an input to minimize the violations. When there are no voltage discrepancies, a process is initiated to provide an input to the control implementation device for purposes of minimizing transmission losses to meet the third objective stated above.

The philosophy of the system mentioned above is discussed in the article "Optimal Real-Time Voltage Control", IEEE Transactions on Power Systems, Vol. 5, No. 3, August, 1990 pages 750-758 by S. A. K. Chang et al. The present invention relates particularly to unique apparatus and circuitry for providing a control implementation device as indicated in FIG. 3.

SUMMARY OF INVENTION

The inventive control implementation device or system comprises a control apparatus for load tapchanging (LTC) transformers such as used on electrical utility transmission systems. The control device includes an LTC control relay having circuitry with the capability to adjust the voltage level bandcenter setpoint from a remote location or source which enables remote adjustment of desired bus voltage level via well known supervisory control analog and data acquisition (SCADA) interface, to maintain optimum bus optimum bus voltage levels, and optimize other system parameters.

The foregoing features and advantages of the present invention will be apparent from the following more particular description of the invention. The accompanying drawings, listed hereinbelow, are useful in explaining the invention.

DRAWINGS

FIG. 4, comprising two drawings FIGS. 4A and 4B, is a schematic diagram showing the voltage level centerband setpoint bias module of the invention;

FIG. 4B1 is an enlarged schematic of the stepper switch portion of FIG. 4B;

DESCRIPTION OF INVENTION

Figure 1:
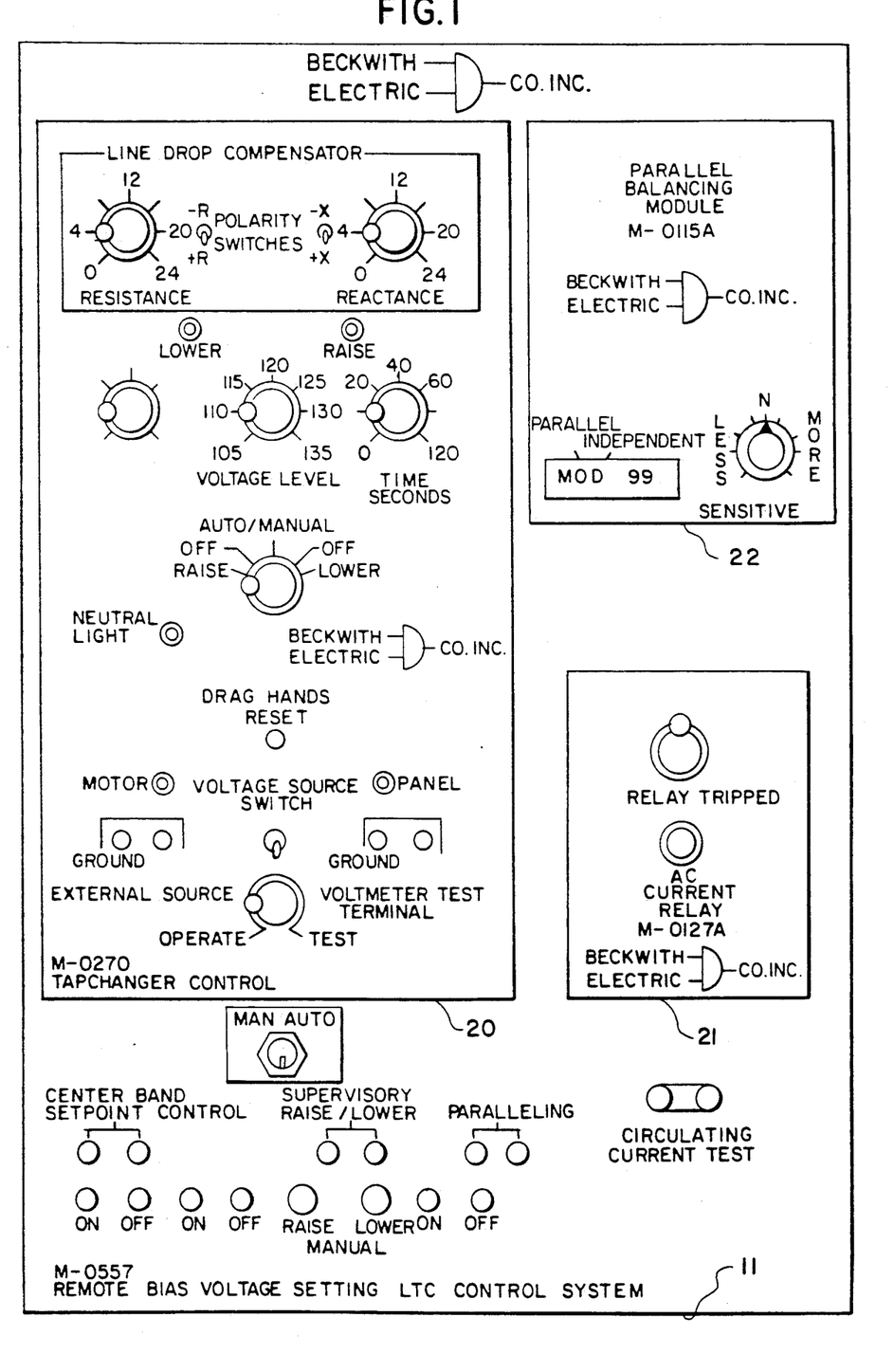
FIG. 1 is a front view showing the front panel of the inventive remote bias voltage setting load tap changing control device or system.

FIG. 1 shows a front view of the remote bias voltage setting load tap changing control implementation device or system 11 of the invention. As will be described hereinbelow, control device or system 11 comprises a number of subsystems.

Figure 2:
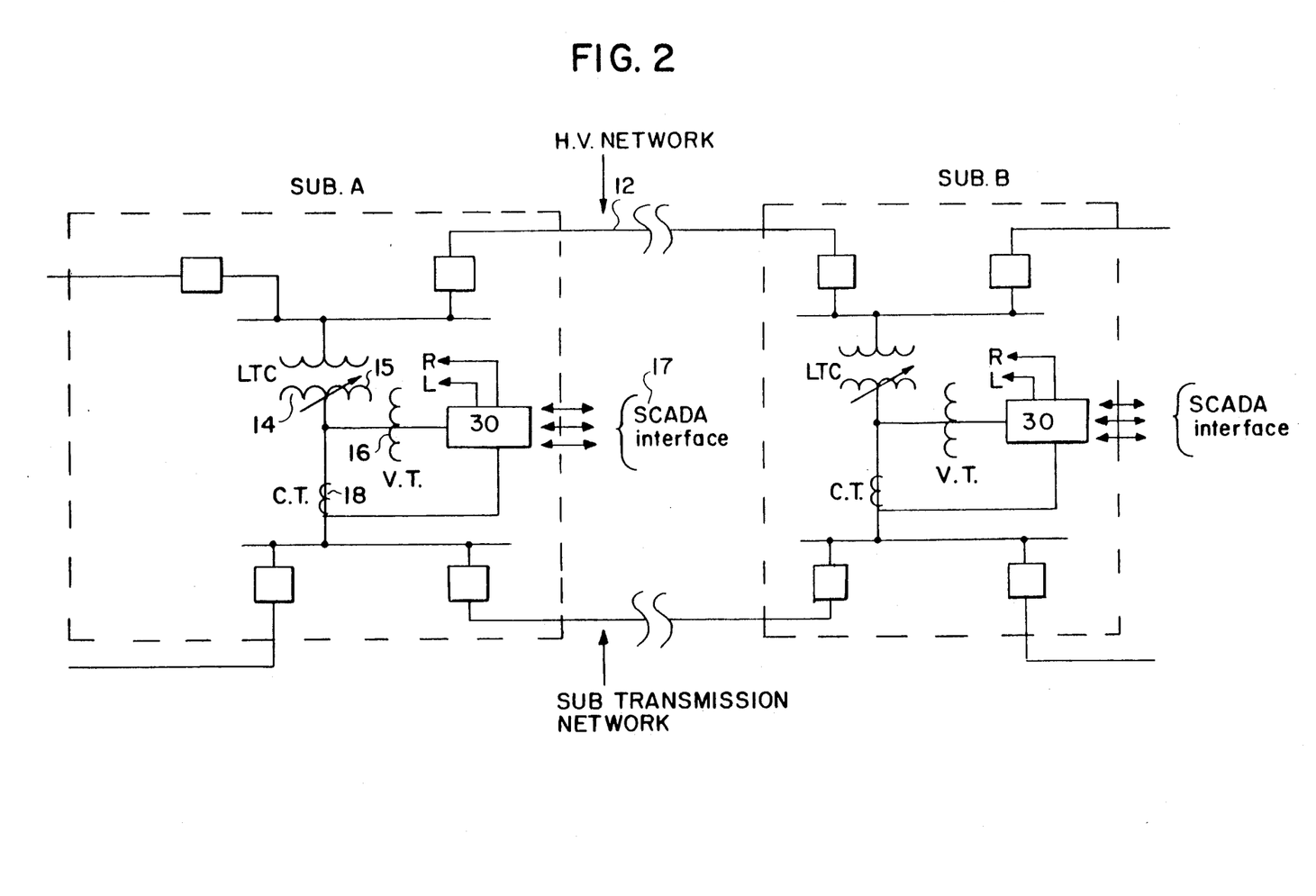
FIG. 2 is a schematic diagram showing a general application of the inventive control device or system in a high voltage network.

The control device or system 11 of the invention may be advantageously utilized in known high voltage electrical utility mesh networks 12, schematically depicted in the drawing. Referring now to FIG. 2, an electrical utility substation A is connected to the high voltage network 12 through a known load tap changing (LTC) transformer 14. The secondary winding 15 of the LTC transformer 14 connects through a step down transformer 16 and a current transformer 18 to the control device or system 11. The (SCADA) communication interface indicated at 17 interconnects with control system 11 which provides a selected output labeled R (raise) and L (lower) to drive the known LTC transformer motor (not shown) to effect the tap change. A similar connection may be provided for electrical utility substation B, and for any of the other substations connected to the network 12.

Referring back to FIG. 1, the control device or system 11 includes a tap changer control 20 which is described in the above noted U.S. Pat. No. 3,721,894 issued to R. W. Beckwith, and U.S. Pat. No. 4,323,838 entitled RMS Controlled Load Tap Changing licensed and assigned to the assignee of the present invention. The tap changer control 20 is also described in the document entitled Tapchanger Control M-0270, Beckwith Electric Co., Inc., P.O. Box 2999, Largo, Fla. 34649-2999, printed 12/89. As briefly described above, the tap changer control 20 senses a voltage representative of the electrical power transmission system. Should the voltage of the system change to a point outside of selected potential range, the tap changer control circuitry energizes the associated motor to move the transformer tap selector switches to make contact with a point of potential to correct the voltage and bring the voltage within the selected potential range.

The inventive control unit system 11 also includes a parallel balancing module 22. The module 22 includes components that must be added to LTC transformer to permit them to operate in parallel, using the circulating current method. Module 22 (commercially designated as Beckwith M-0115) is used in conjunction with the M-0270 tap changer control 20 and is fully described in the document Parallel Balancing Module M-0115, Beckwith Electric Co.

The control device 11 further includes an AC Current relay 21 used in the circulating current circuit of load tap changing transformer to prevent damaging circulating current flow should the transformer controls fail to keep the transformers on essentially the same taps when using the circulating current method of paralleling transformers. The AC current relay 21 is fully described in the document, AC Current Relay M-0127A/M-0170A of Beckwith Electric Co., printed 10/89.

Figure 4A:
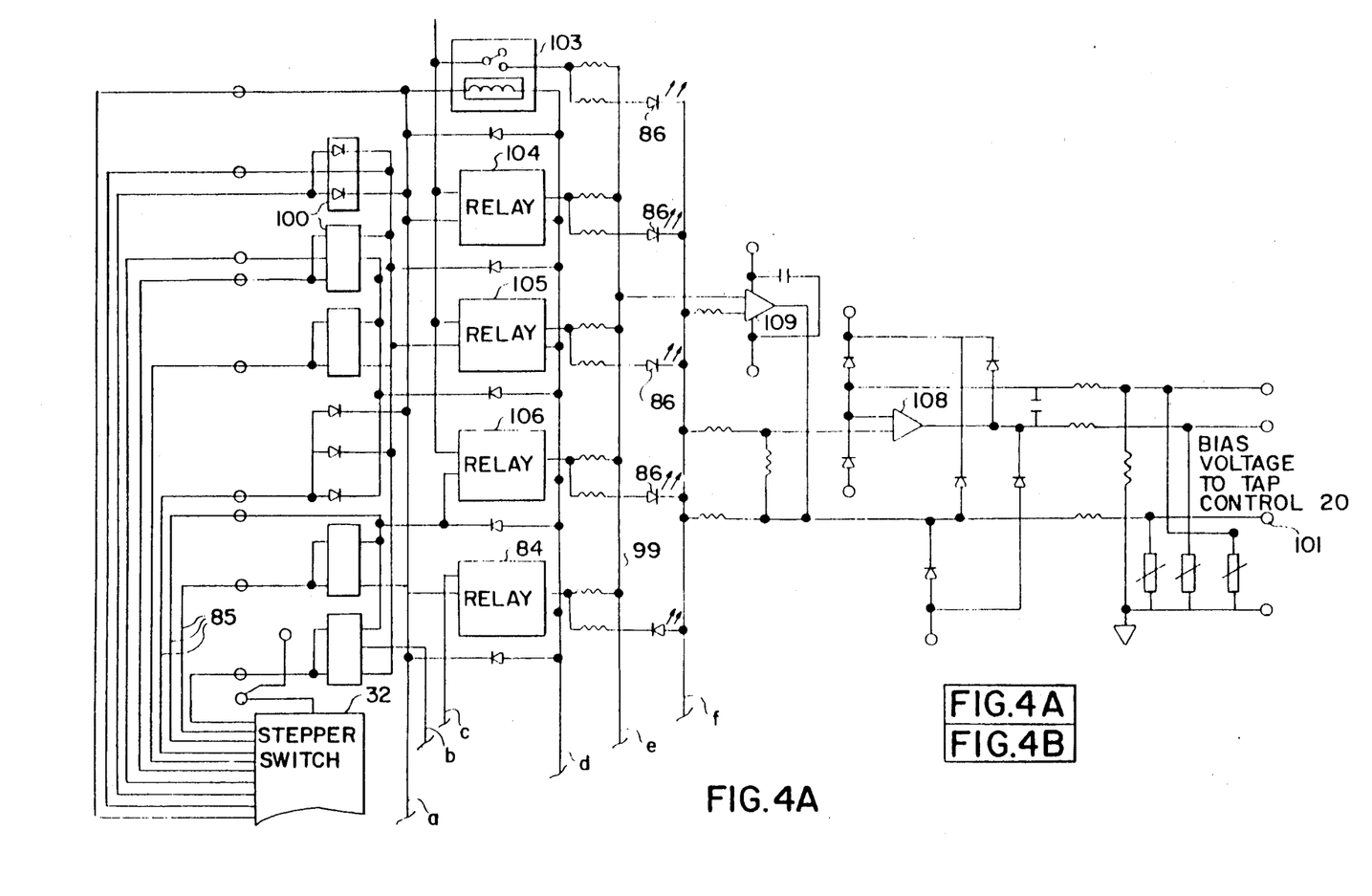
Figure 4B:
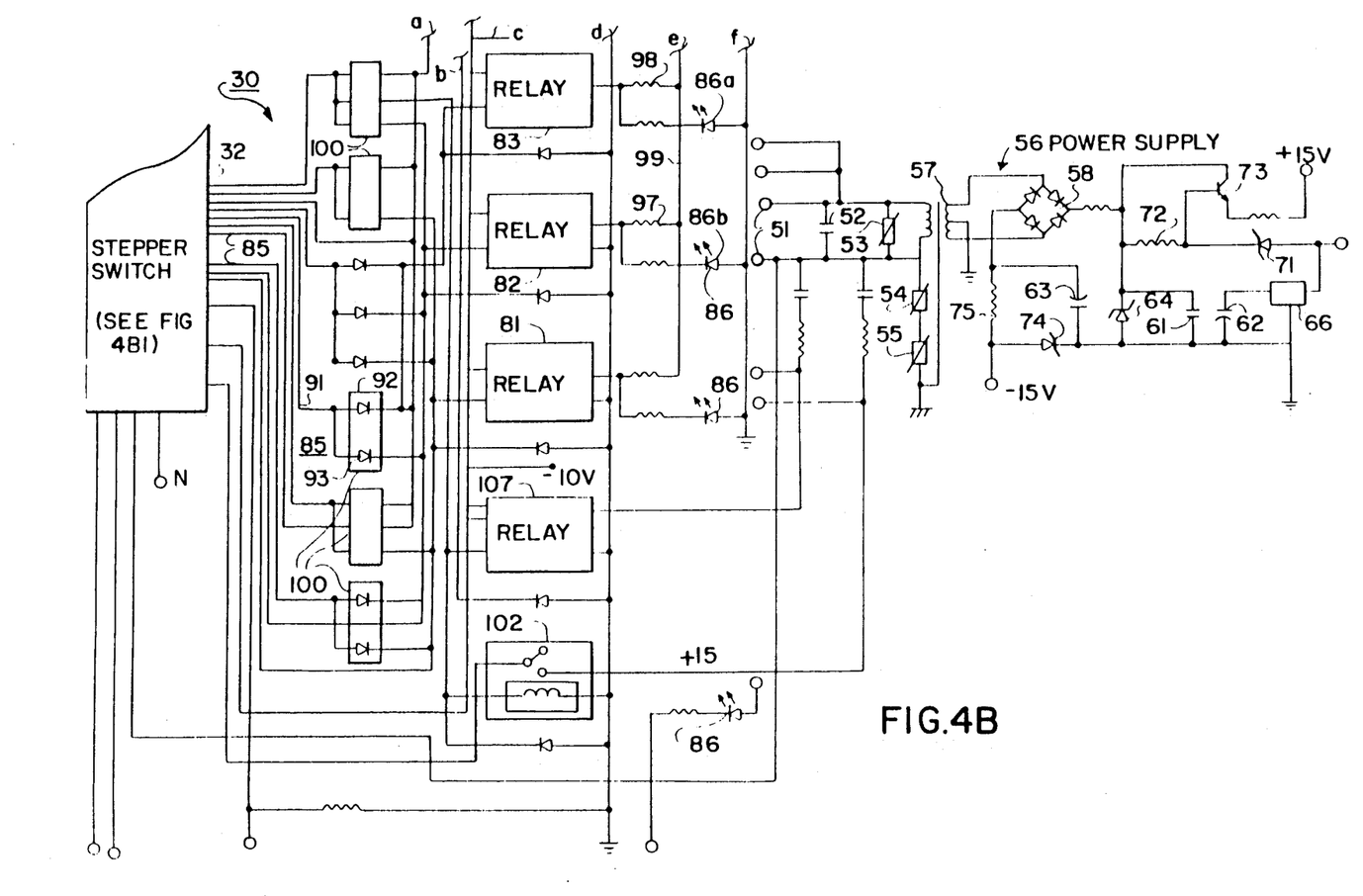
Figure 4B:
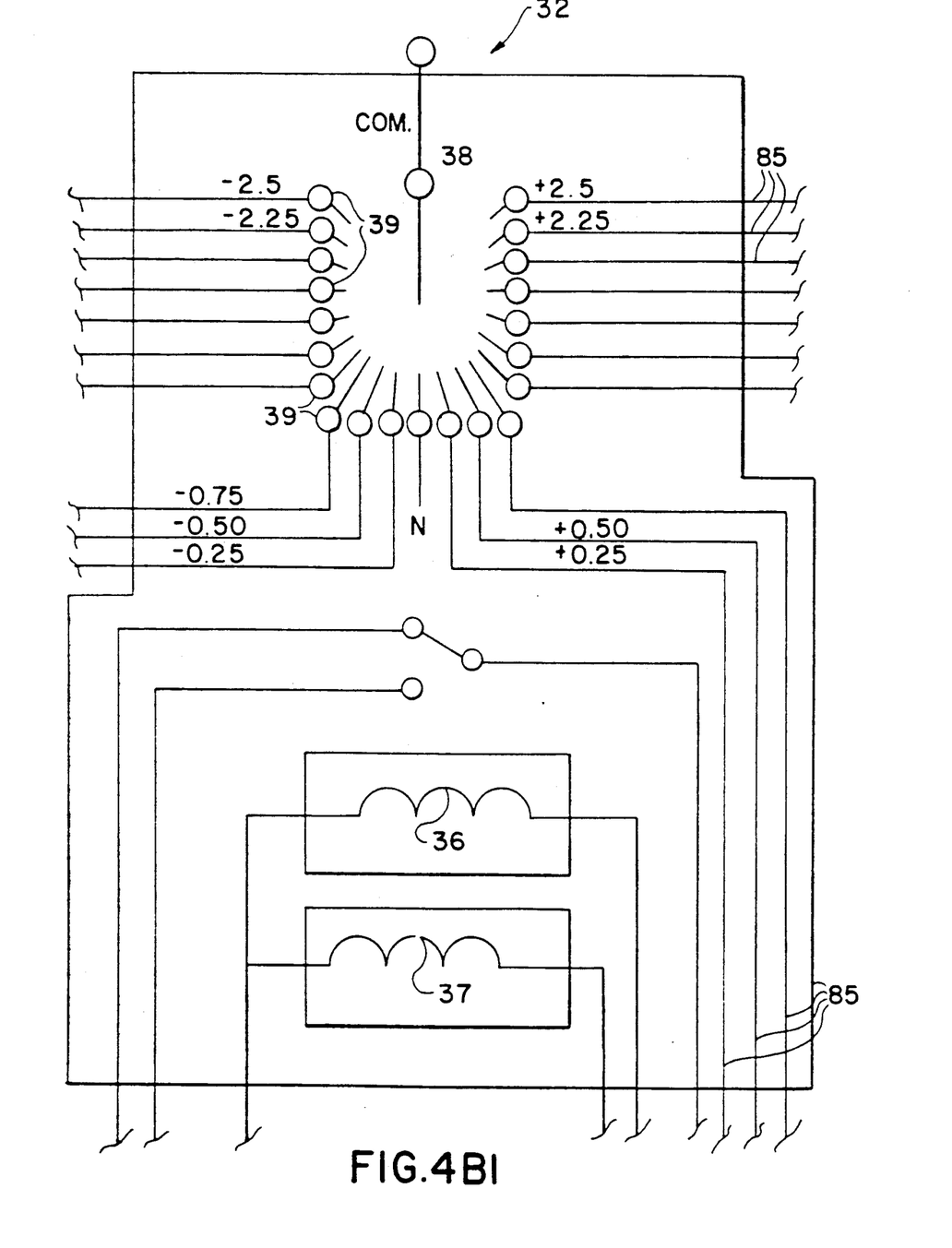
Figure 5:
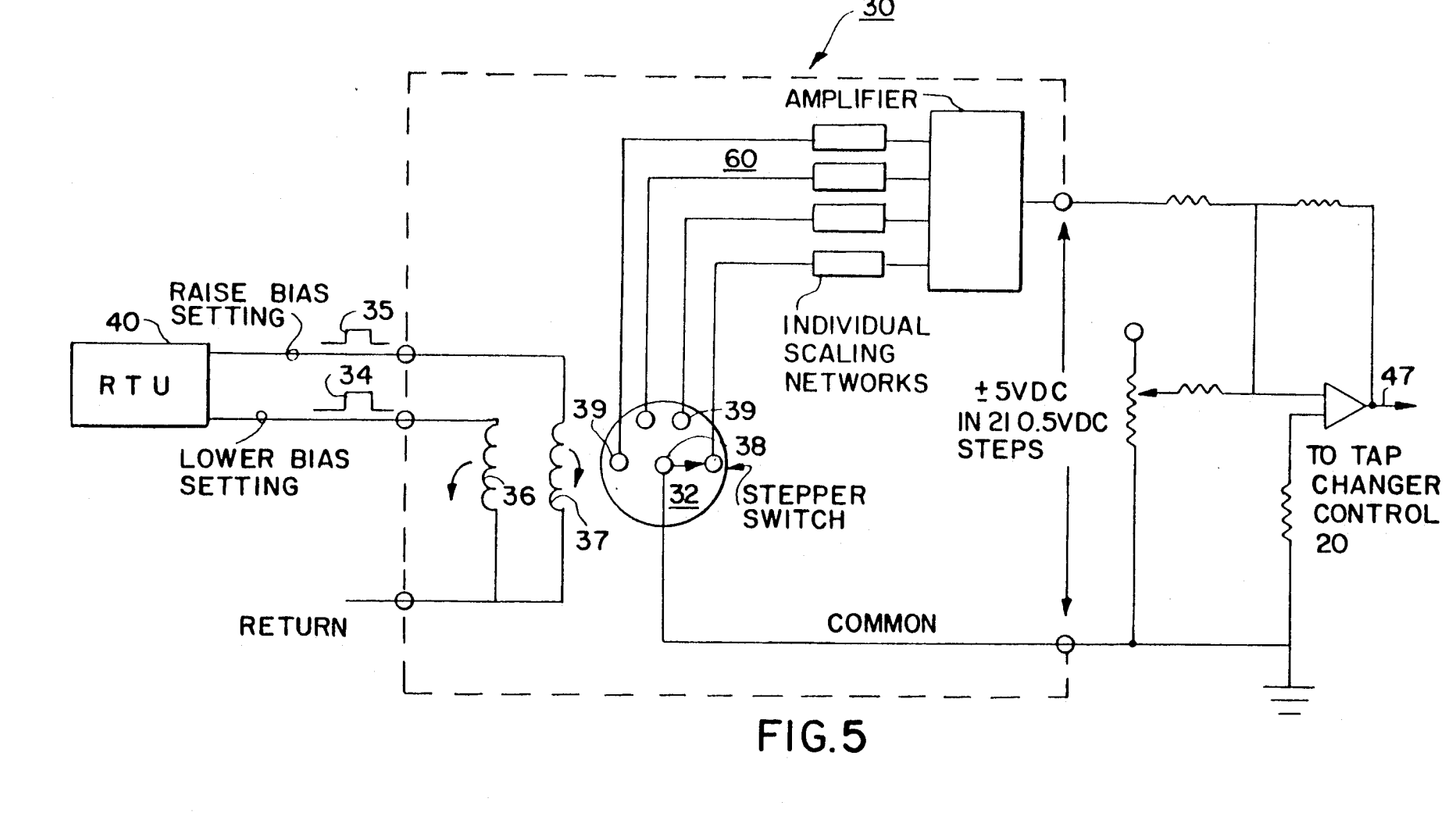
FIG. 5 is a block diagram of the centerband setpoint bias module of FIG. 4.

The inventive control system 11 includes a unique centerband setpoint bias module 30, see FIGS. 4, 4B, and 5. The module 30 which will be described in detail hereinbelow provides a direct current voltage source to offset the voltage setting on the tapchanger control system 11, as is adjusted by the pulses coupled to the setpoint bias module 30 from the network SCADA interface.

The voltage level bandcenter setpoint bias module 30 may be remotely altered in 10 discrete steps above and 10 discrete steps below the front panel establishing set point. Thus, by operator selection, the panel setting may be 120 V relating to the system operating voltage as 1.0 per unit with an adjustment range of +2.5%, for example, a remotely adjustable bandcenter setpoint range of 117.0 V to 123.0 V.

The control system 11 provides a means by which an electrical utility transmission system may regulate transformer output voltage so as to eliminate or minimize system bus voltage limit variations and to minimize the power (watt) loss in the transmission system.

The control system 11 operates in conjunction with a known system load flow simulation program which receives data (bus voltages, line loadings) telemetered from a mesh or network system wherein the distribution of loading in the transmission network will be dependent upon the operating tap position of the various load tap changing transformers.

As indicated above, tolerable operating voltage limit ranges for the individual transmission system busses are pre-established. If there is a voltage variation the tap positions of the transformers have to be to changed to re-establish the voltage magnitude to within desired bounds at any bus. Since, as is known, in mesh networks a change of voltage at one mode will affect current flow throughout the network. Consequently, it will be a second control objective to accumulate line loading data from throughout the network, and calculate, by established computer programs, the transmission losses then existing. The load flow simulation will then computationally simulate the change of transformer tap positions individually and collectively throughout the system to determine if there is a preferred condition which will not violate the preset bus voltage limit criteria, and which will result in a reduction of the total line lossed in the system. If such a condition is found, the master can communicate such information to the LTC transformer optimal power flow voltage controllers so that the controllers will alter their controls. Thus, the load flow throughout the system will be altered and system losses reduced.

Optimal power flow control produces a reduction in electrical utility system operating losses and thereby reducing fuel costs to the utility. The present invention provides a control structure and circuitry for implementing optimal power flow in an electrical transmission system.

In the prior art, a command could be issued to "RAISE" or "LOWER" the tap position of a particular transformer in a remote mode. The LTC would then, effectively abandon its local voltage control to the higher authority. Using this invention, the settings of the local control can be established to effectively check for voltage violations at the local bus and command tapchanger action accordingly without intervention from or involvement of the master station.

Refer again to FIGS. 4A, 4B, 4B1, and 5. The setpoint module 30 incorporates a stepping (stepper) switch 32 which increments around twenty-one positions as input pulses indicated as 34 and 35 are received from a SCADA communications interface. The input pulses 34 and 35 cause the relay coils 36 and 37, respectively, to actuate the movable contact 38 to move the contact to rotate in one or the other direction to provide a "RAISE" or "LOWER" function. As will be described, and clearly shown in FIG. 5, each step position change couples a particular voltage through the individual scaling networks generally labeled 60 to couple a voltage as an input signal 47 to the load tapchanging control 20. The output from module 30 will range from −5 Vdc to +5 Vdc in 21 steps of 0.5 Vdc per step depending upon the stepping switch position.

Figure 6:
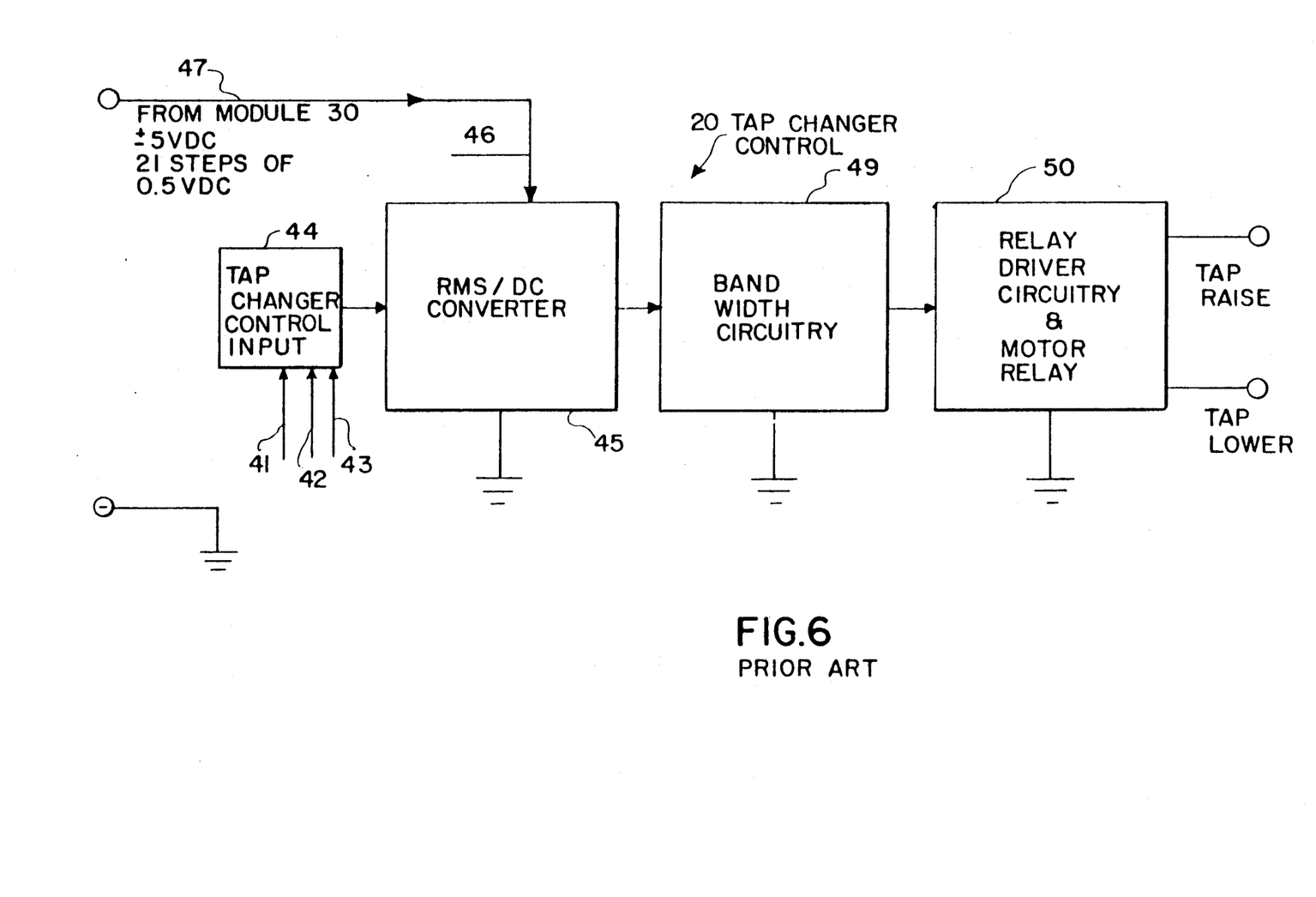
FIG. 6 is a block diagram showing the coupling of the output of the bias module to the tap changer control.

The bias signal from module 30 is applied to the tapchanger control 20 as shown in FIG. 6. More particularly, three signals are coupled to the portion 44 of the tapchanger control 20 comprising a circulating current compensation input 42, a line drop compensation input 43, and a scaled transformer output voltage 46 which is representative of the system bias voltage. The circuit portion 44 combines these inputs and applies this voltage to the RMS/DC convertor 45. Convertor 45 also receives a bias signal 46 comprising a voltage level setpoint input 41 and the voltage on line 47 from module 30 and provides a DC signal 48 conditioned to the inputs 41, 42, 43, 46, and the bias voltage from bias module 30. The output of convertor 45 is coupled to known band width circuitry 49 and relay driver and motor relay circuitry 50 to provide respective transformer tap raise and tap lower signals. In this way, LTC control 20 recognizes a new centerband setpoint to implement system voltage change.

As mentioned above, with reference to FIG. 5, coils 36 and 37 are energized to selectively move the movable stepper contact 38. A distinct electrically independent, circuit is selectively effected through one of twenty-one stationary taps generally labeled 39 on the switch 32, each tap representing one of the possible voltage bias levels. In the present embodiment, the electronic circuitry 60 scales the source voltage in 0.5 Vdc steps over the range of −5 Vdc to =5 Vdc at the output terminals, the exact output voltage being a function of the particular position of movable contact 38 on stationary taps 39.

As described above with reference to FIG. 6, the bias signal is then combined or added as an additional input to other standard signals in a modified LTC control 20 such that the dc signal derived is indicative of the desired transformer output voltage which includes the effect of the bias signal. The command for a "RAISE" or "LOWER" operation of the load tapchanger is properly offset to reflect the bias setting.

Refer now to the schematic diagram of the centerband setpoint bias module 30 shown in FIG. 4A and 4B. The power supply 56 (right upper corner of FIG. 4B) converts a 120 VAC power input to terminals generally labeled 51 to the dc voltage required for the circuitry of module 30. Capacitor 52 and metal oxide varistor (MOV) 53 are used to suppress transverse mode transients at the input. MOV 54 and MOV 55 are common mode suppressors that allow up to 1500 V rms common mode voltage, but will clip any transients above this level. Transformer 57 converts the 120 VAC input to 36 VAC center tapped output.

Diodes, generally labeled 58 form a full wave rectifier that produces +24 Vdc and −24 Vdc from the secondary of transformer 57. Capacitors 61 and 62 filter the ac ripple from the +24 Vdc and capacitor 63 smoothes out the −24 dc. Zener diode 64 clips off any transients that may remain on the +24 Vdc, protecting transistor 73 and IC 66.

IC 66 converts the +24 Vdc to a precision +10 Vdc reference voltage for use by the internal circuitry. The −15 Vdc level is formed by zener diode 71, resistor 72 and transistor 73. The −15 Vdc is provided by zener diode 74 and dropping resistor 75.

Refer now to FIGS. 4A, 4B, 4B1, and 5. Depending on the position of the stepping switch 32, ±24 Vdc voltage is connected sequentially to one of the output terminals. The terminals or taps 39 connect through leads generally labeled 85 to sequentially connect (going sequentially counter clockwise) from −2.5, −2.0,—through −0.25 and N. (see FIG. 4B1). Continuing counter clockwise the steps are +0.25, +2.0,—to +2.5. The foregoing designations represent the percent voltage bias associated with the particular one of taps 39. The circuits from the taps 39 lead to groups of relays, each coupling to a selected tap range, for example, relays 81–84 relate to the plus (positive) tap range. The relays 81, 82, 83, 84, 102, 103, 104, 105, 106, and 107 are two position switches driven by a single coil as indicated for relays 102 and 103.

The output of each tap 39 position of switch 32 connect to those busses or lines generally labeled 85 which will power the four relays in that selected range. The busses, associated relays, and light emitting diodes generally labeled 86 are configured so as to count in a binary manner. For example and referring to FIG. 4A and 4B, relay 81 provides a count of 1, relay 82 provides a count of 2, relay 83 provides a count of 4 and relay 84 provides a count of 8. If the tap 39 representing +1.5% voltage is selected, the +24 Vdc appears at line 91, and that terminal 91 is in turn connected to the +2 bus via diode 93 and the +4 bus via diode 92. Also, relay 83 and LED 86a are powered representing +4 along with relay 82 and LED 86b representing +2 for a total bias representing the +6 tap. As a result of the action of relays 83 and 82, resistors 97 and 98 are placed electrically in parallel and form the input to the negative rail (lead) 99 connecting to IC 100, required to produce 2 × 1.5 = +3.0 Vdc bias voltage at terminal 101. Note all the diode pairs generally labeled 100 include a pair of diodes connected as shown for diodes 92 and 93.

Relay 102 (FIG. 4B) blocks the (R) raise circuit when the stepping switch 32 has reached position +2.5 percent. The bias module 30 and stepping switch 32 function in an analogous way, using relays 103, 104, 105, and 106 for the output signal, and 107 for blocking when in the minus or negative range.

IC module 108 provides a +1.0 mA analog output signal, which can be be used to feed into SCADA interface to discern the present position of stepper switch 32.

The control system 11 thus provides all the features of a tapchanger control with the addition of a remotely and automatic controlled setpoint bias module that enables an initial bandcenter setting to be changed by SCADA contact closure.

Although particular embodiments of the present invention have been described and illustrated herein, it should be recognized that modifications and variations may readily occur to those skilled in the art and that such modifications and variations may be made without departing from one spirit and scope of the invention.

We claim:

1. In a alternating current power transmission or distribution system utilizing load tap changing (LTC) transformers having selectively actuable tap selector switches, a remote bias voltage setting LTC control system comprising in combination,
    (a) a load tap changing control having a plurality of signal inputs,
    (b) means for establishing a voltage band within which an associated transformer must provide an output,
    (c) means for providing a center voltage level for said band,
    (d) means for providing a remotely adjustable bias voltage with said center voltage to change the center operating level of said band,
    (e) a parallel current balancing module and an AC overcurrent relay for enabling paralleling of associated LTC transformers,
    (f) supervisory control analog and digital access communication means, and
    (g) means for coupling control pulses through said communication means to control said means for providing said remotely adjustable bias voltage.

2. Apparatus as in claim 1 further including software programming for obtaining optimum power flow in said distribution system, and a supervisory control analog and digital access communication system for providing control pulses to said adjustable bias voltage means.

3. Apparatus as in claim 2 wherein said software programming simulates changes of selected voltage outputs from load tap changing transformer and evaluates said changes prior to providing control pulses to said means for providing said adjustable bias voltage.

4. Apparatus as in claim 1 wherein said load tap changing control includes an RMS to DC converter and motor means for actuating tap changing switches, said voltage defining a center point of said voltage band being coupled as one input to said converter, the output of said converter being coupled to drive said tap changing switches, and further including, (a) an alternating current relay for controlling circulating currents effected by said LTC transformers, and (b) a parallel balancing means for controlling the position of said LTC transformer taps to minimize circulating current in said LTC transformers.

* * * * *